(12) United States Patent  
Sundaresan et al.

(10) Patent No.: US 10,410,025 B2  
(45) Date of Patent: Sep. 10, 2019

(54) PRODUCT CHECKOUT AND INTEREST DETECTION IN RETAIL ENVIRONMENT USING RADIO-FREQUENCY IDENTIFICATION

(71) Applicant: NEC Laboratories America, Inc., Princeton, NJ (US)

(72) Inventors: Karthikeyan Sundaresan, Manalapan, NJ (US); Eugene Chai, Monmouth Junction, NJ (US); Sampath Rangarajan, Bridgewater, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 15/954,083

(22) Filed: Apr. 16, 2018

(65) Prior Publication Data

US 2018/0307877 A1    Oct. 25, 2018

Related U.S. Application Data

(60) Provisional application No. 62/487,203, filed on Apr. 19, 2017.

(51) Int. Cl.
| | |
|---|---|
| G06K 15/00 | (2006.01) |
| G06F 19/00 | (2018.01) |
| G06Q 30/00 | (2012.01) |
| G06Q 90/00 | (2006.01) |
| G06K 7/10 | (2006.01) |

(Continued)

(52) U.S. Cl.
CPC ..... *G06K 7/10366* (2013.01); *G06K 7/10009* (2013.01); *G06K 7/10356* (2013.01); *G06Q 20/18* (2013.01); *G07G 1/009* (2013.01); *G07G 1/0081* (2013.01)

(58) Field of Classification Search  
USPC ................. 235/383, 385, 451, 492  
See application file for complete search history.

(56) References Cited

U.S. PATENT DOCUMENTS

| | | | |
|---|---|---|---|
| 8,988,199 B1 * | 3/2015 | Moretti | G06K 7/10118 235/383 |
| 2002/0170961 A1 | 11/2002 | Dickson et al. | |

(Continued)

OTHER PUBLICATIONS

Gai et al., "Localization Algorithm Based on Zigbee Wireless Sensor Network with Application to an Active Shopping Cart", 2014 IEEE/RSJ International Conference on Intelligent Robots and Systems (IROS 2014), Sep. 2014, pp. 4571-4576.

Guo et al., "RollCaller: User-Friendly Indoor Navigation System Using Human-Item Spatial Relation", IEEE INFOCOM 2014—IEEE Conference on Computer Communications, May 2014, pp. 2840-2848.

Han et al., "CBID: A Customer Behavior Identification System using Passive Tags", 2014 IEEE 22nd International Conference on Network Protocols, Oct. 2014, pp. 48-58.

(Continued)

*Primary Examiner* — Tuyen K Vo  
(74) *Attorney, Agent, or Firm* — Joseph Kolodka

(57) ABSTRACT

Systems and a method are provided for use with a shopping cart in a store. A system includes Radio-Frequency Identification (RFID) tags, including item RFID tags associated with items for sale and reference RFID tags associated with various aisles in the store, for providing RFID data. The system further includes a RFID reader, operatively coupled to the shopping cart, and configured to the read RFID data from the item RFID tags and the reference RFID tags, extract features from the RFID data, identify any of the items having feature values associated therewith greater than a threshold amount as inside-cart items to be processed during an automatic checkout, and perform the automatic checkout on only the inside-cart items.

18 Claims, 7 Drawing Sheets

(51) Int. Cl.
G06Q 20/18 (2012.01)
G07G 1/00 (2006.01)

(56) References Cited

U.S. PATENT DOCUMENTS

| | | |
|---|---|---|
| 2008/0231448 A1 | 9/2008 | Fowler et al. |
| 2009/0140046 A1* | 6/2009 | Landers, Jr. ......... G06Q 10/087 235/385 |
| 2012/0310939 A1* | 12/2012 | Lee ....................... G06Q 10/04 707/739 |
| 2014/0361078 A1* | 12/2014 | Davidson ........... G06K 7/10356 235/385 |
| 2015/0046436 A1* | 2/2015 | Li ....................... G06F 17/3053 707/723 |

OTHER PUBLICATIONS

Liu, et al., "TagBooth: Deep Shopping Data Acquisition Powered by RFID Tags", 2015 IEEE Conference on Computer Communications (INFOCOM), Apr. 2015, pp. 1670-1678.

Rupanagudi, et al., "A Novel Video Processing based Cost Effective Smart Trolley System for Supermarkets using FPGA", 2015 International Conference on Communication, Information & Computing Technology (ICCICT), Jan. 2015, 6 pages.

You et al., "Using Mobile Phones to Monitor Shopping Time at Physical Stores", Pervasive Computing, Apr.-Jun. 2011, pp. 37-43.

* cited by examiner

PRODUCT CHECKOUT AND INTEREST DETECTION IN RETAIL ENVIRONMENT USING RADIO-FREQUENCY IDENTIFICATION

RELATED APPLICATION INFORMATION

This application claims priority to provisional application Ser. No. 62/487,203, filed on Apr. 19, 2017, and incorporated herein by reference.

BACKGROUND

Technical Field

The present invention relates to Radio-Frequency Identification (RFID), and more particularly to product checkout and interest detection in retail environment using RFID.

Description of the Related Art

Retail checkout serves as both a gantry for the customer to complete his/her purchases, and a source of information for the retail owner to gain insight into customer interests. However, the current checkout structure has several limitations that hinder the ideal seamless shopping experience expected by customers.

One such limitation is an inefficient checkout process. Cashier-based checkout is the most widely system today. However, cashier-based checkout typically suffers from long delays and variable customer service quality. Self-checkout systems are the state-of-the-art system in retail automation, and aim to improve the checkout experience. However, inefficiencies in the self-checkout process, such as slow bar-code scanning technology and a non-intuitive user-interface, can slow down the checkout process and do little to alleviate the overall checkout delay. Checkout wait-times is particular pain-point. However, it is believed that it is insufficient to merely reduce the wait times. Rather, the entire checkout process should be optimized to ensure that a pleasant checkout experience is maintained at no delay.

Another limitation of retail checkout is limited personalization. Market research has also shown that the majority of customers demand targeted offers on products related to their personal interests. More importantly, a significant number of customers will value product recommendations related to items purchased (e.g., wine pairing for a meal and so forth). The current checkout system is a monolithic step at the end of the shopping process, and cannot provide real-time, continuous personalization to the customer during the customer's shopping experience.

Yet another limitation of retail checkout is limited retailer insight. Fine-grained customer metrics are important to measure the effectiveness of the retail environment. With deep shopping behavior data, retailers can capture customers' behaviors, to provide personalizations such as targeted advertisements to enhance retail performance. Mining customer shopping behavior in online stores is easily achievable by analyzing the click streams and customer shopping carts. However, retailers with physical stores still lack effective methods to identify comprehensive customer behaviors. The only information readily available to retailers is the sales history, which fails to reflect customer behaviors before they check out. The customer browsing behavior, which reflects customer interest in products in the store, is not available to retailers.

Hence, there is a need for an integrated checkout solution that can offer fine-grained insights into the customer behavior, so that retail growth can be maintained.

SUMMARY

According to an aspect of the present invention, a system is provided for use with a shopping cart in a store. The system includes Radio-Frequency Identification (RFID) tags, including item RFID tags associated with items for sale and reference RFID tags associated with various aisles in the store, for providing RFID data. The system further includes a RFID reader, operatively coupled to the shopping cart, and configured to the read RFID data from the item RFID tags and the reference RFID tags, extract features from the RFID data, identify any of the items having feature values associated therewith greater than a threshold amount as inside-cart items to be processed during an automatic checkout, and perform the automatic checkout on only the inside-cart items.

According to another aspect of the present invention, a method is provided for use with a shopping cart in a store. The method includes reading, by a Radio-Frequency Identification (RFID) reader operatively coupled to the shopping cart, RFID data from Radio-Frequency Identification (RFID) tags including item RFID tags associated with items for sale and reference RFID tags associated with various aisles in the store. The method further includes extracting, by the RFID reader, features from the RFID data. The method also includes identifying, by the RFID reader, any of the items having feature values associated therewith greater than a threshold amount as inside-cart items to be processed during an automatic checkout. The method additionally includes performing, by the RFID reader, the automatic checkout on only the inside-cart items.

According to yet another aspect of the present invention, a system is provided for use with a shopping cart in a store. The system includes Radio-Frequency Identification (RFID) tags, including item RFID tags associated with items for sale and reference RFID tags associated with various aisles in the store, for providing RFID data. The system further includes a RFID reader, operatively coupled to the shopping cart, and configured to the read RFID data from the item RFID tags and the reference RFID tags, extract features from the RFID data, and identify any of the items having feature values associated therewith that vary greater than a threshold amount over a threshold time duration as items of interest.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to product checkout and interest detection in retail environment using Radio-Frequency Identification (RFID).

In an embodiment, a RFID-based smart shopping system is provided which helps users to check-out items faster and to track purchases in real-time. In parallel, in an embodiment, the present invention can also provide a store owner with information about user interest on particular items. A main component of the present invention is a customized shopping cart having a RFID reader which reads RFID tagged items. To provide check-out facility, the present invention accurately detects inside-cart items with practically minimal/non-significant delay by exploiting the fact that the physical level information (Received Signal Strength Indication (RSSI), phase, Doppler, read rate, and so forth) of inside-cart RFID tags are different than outside-cart RFID tags.

In an embodiment, the present invention can also accurately detect user interest by exploiting the change in physical level parameters of a RFID tag on an object with which the user interacted.

Figure 1:
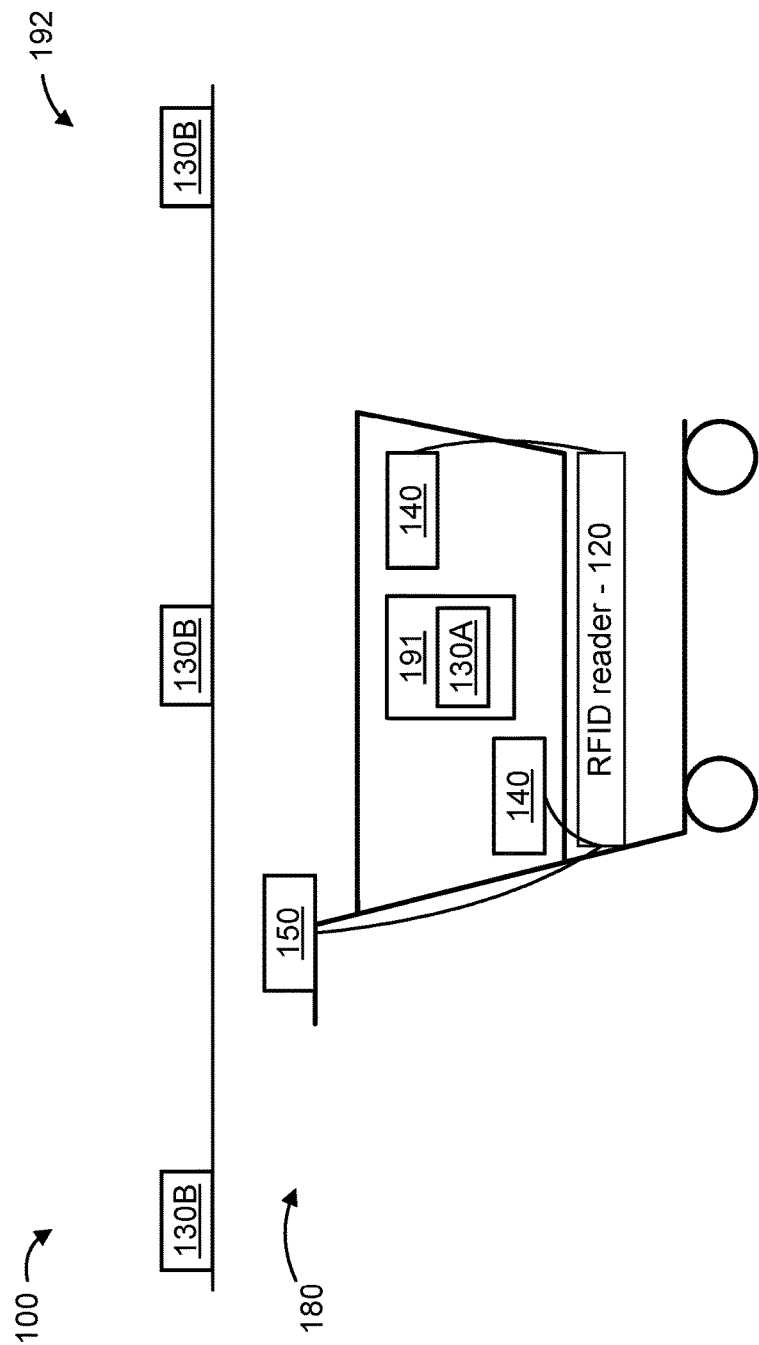
FIG. 1 is a block diagram showing an exemplary system for product checkout and interest detection, in accordance with an embodiment of the present invention.

FIG. 1 is a block diagram showing an exemplary system 100 for product checkout and interest detection, in accordance with an embodiment of the present invention.

The system 100 includes a shopping cart 110, a Radio-Frequency Identification (RFID) reader 120, and RFID tags 130. The system 100 can further includes a set of RFID antennas 140 and a tablet 150.

The RFID tags 130 can include item RFID tags 130A and reference RFID tags 130B. The item RFID tags 130A are attached to and/or otherwise associated with items 191 capable of being purchased by a customer. The reference RFID tags 130B are placed at various locations in aisles 192 of the store in order to provide reference points for use by system 100.

In an embodiment, the RFID reader 120 described hereinafter is an enhanced RFID reader supplemented to perform various functions in accordance with various embodiments of the present invention. Such an approach can be preferred since the RFID reader has its own processor, memory, and communication technology to implement such functions. However, in another embodiment, a separate device (e.g., computing device) having a processor, memory, and transceiver can be used to perform such functions, while maintaining the spirit of the present invention. For example, in an embodiment, a separate device, provided with the cart, can be operatively coupled to the cart to implement such functions. In another embodiment, a tablet coupled to the cart can be used to implement such functions. In yet another embodiment, the user's smart phone can be used to implement such functions. These and other possibilities are readily contemplated by one of ordinary skill in the art given the teachings of the present invention provided herein, while maintaining the spirit of the present invention.

The RFID reader 120 can be configured to read RFID tags 130A of items placed in the shopping cart 110 as well as proximate reference RFID tags 130B. In particular, the RFID reader 120 can be configured to distinguish between items within the shopping cart 110 from items outside of the shopping cart 110. Such a configuration allows for seamless automatic checkout as described herein.

In an embodiment, the RFID reader 120 can also be configured to read RFID tags of items touched by (e.g., picked up by) a user. Such a configuration allows for (user) interest detection as described herein.

To aid in such RFID reading, the set of antennas 140 can be arranged in various locations of the shopping cart 110. The antennas 140 can be used to generate a temporal feature matrix from features extracted from the RFID tags.

The tablet 150 is used by a user of the shopping cart 110 to essentially check in so that the user can then begin exploiting the features of the present invention, namely seamless automatic checkout and interest detection.

In an embodiment, the temporal feature matrix can be configured as follows. Each row in the matrix represents a single feature, measured over time (that will be used for classification). Each column in the matrix represents a set of features that correspond to a single unique RFID tag. That is, each column of features corresponds to a single known RFID tag with a known ID.

In an embodiment, features that can be used include, but are not limited to, reading count, median Received Signal Strength Indication (RSSI) value, median phase value, and median Doppler shift value for RFID tags. Then, K-means clustering (or some other clustering approach) can be performed on the temporal feature matrix to obtain two resultant clusters as follows: inside-cart RFID tags; and outside-cart RFID tags. The temporal feature matrix is created by extracting features from the data collected or certain time durations (e.g., but not limited to, every 30 second duration). The K-means clustering process can be provided with initial seeds from features derived from inside-cart and outside-cart RFID tags. Before creation of the temporal feature matrix, the mobility state (mobile or static) of the cart is detected since, in an embodiment, creation of the temporal feature matrix is commenced after the shopping cart is detected to be mobile. If the cart is mobile, then the outside-cart reference tags (assuming that the mapping of reference tags and aisle has been precomputed) and the population of tags will be changing. By tracking the change and determining that the change is over a certain threshold, it can be determined that the shopping cart is mobile; otherwise the shopping cart is considered to be static. We also track the variance of phase and RSSI of inside-cart items which will be more in a mobile setting compared to a static situation. This also increases the confidence of cart mobility state detection. The intuition behind this algorithm is that the feature values inside the shopping cart items change less compared to the items outside the shopping cart.

In an embodiment, the present invention infers the interest of a user on a particular item based on whether or not the user has picked up the item. There are two main obstacles to detecting whether or not a user has picked up an item, as follows: (1) noise in captured features due to multi-path and blockage; and (2) less number of reads or no reads of RFID tags of interest due to random back-off and collision. This can be caused by more reads of inside items or outside items in different sections of the same aisle or residing in another aisle. If the impact of noise on different features is ignored based on an assumption that the impact would be similar to outside RFID tags, then the second issue has to be addressed.

We have developed a hierarchical approach to pin-down the tags of interest, which is described as follows. Interest detection can be initiated/commenced responsive to a detection that the mobility status of the shopping cart is static. The probability of reading changes of the RFID tag of interest can be increased by filtering via a precomputed aisle level filter (which can reduce the interrogation zone of the reader only in the aisle) and by also filtering out the inside-cart items. The inside-cart items can be filtered by creating an item level filter of 32 bits for each inside-cart item. By doing this, the interrogation zone can be concentrated to an aisle of interest without the inside-cart items. Then, the values (RSSI/phase) of the RFID tags which are in the isle and outside the cart are recorded. The idea is to identify RFID tags of which the phase variation is more than a certain threshold amount compared to other RFID tags. Those RFID tags are marked as RFID tags of interest. To achieve that, we can compute the divergence of these RFID tags compared to other RFID tags. In an embodiment, the divergence is computed as the Kullback-Leibler (KL) divergence.

Figure 2:
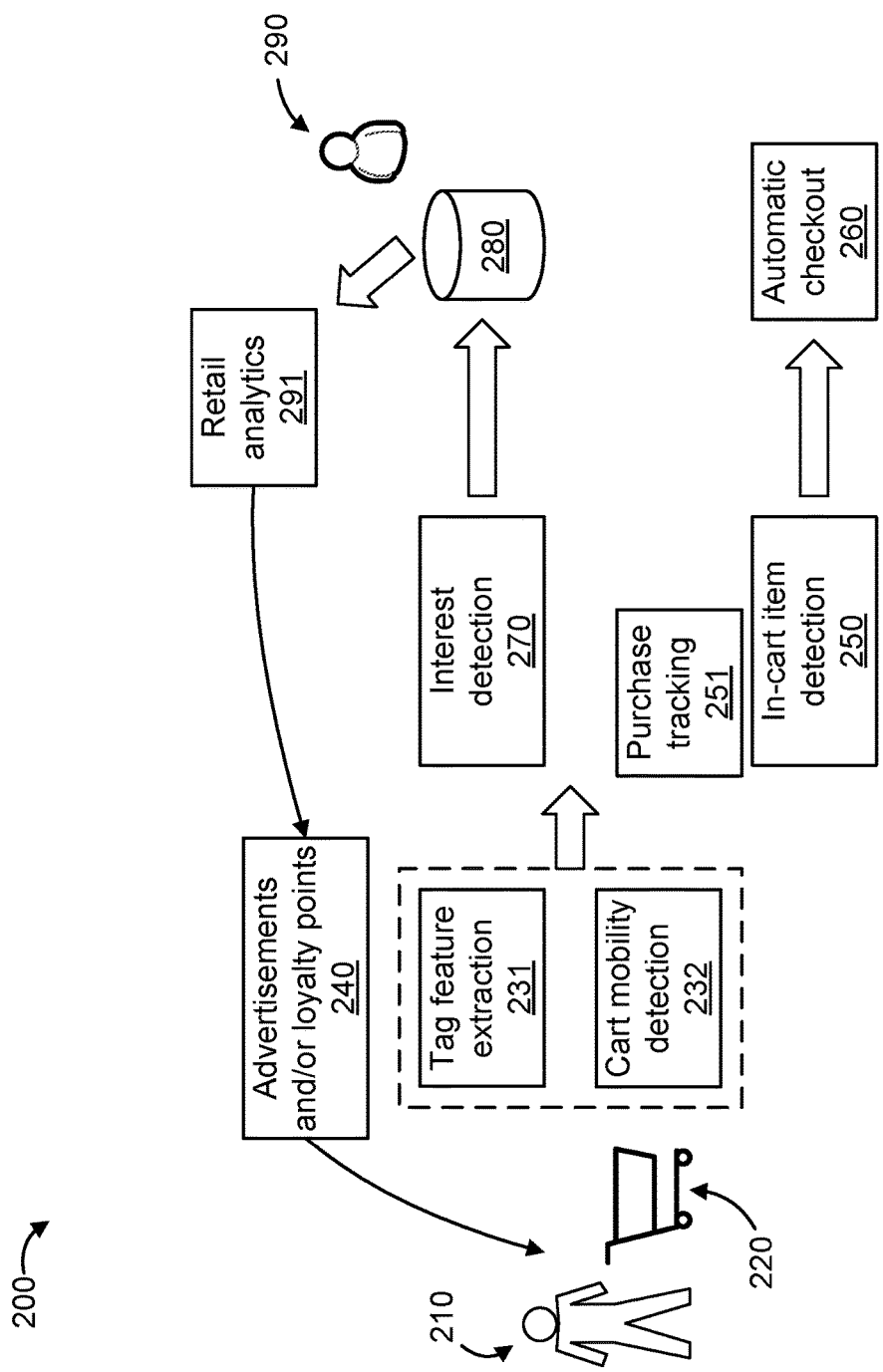
FIG. 2 is a block diagram showing an exemplary architecture of the present invention, in accordance with an embodiment of the present invention.

FIG. 2 is a block diagram showing an exemplary architecture 200 of the present invention, in accordance with an embodiment of the present invention.

In general, the architecture 200 can be considered to involve two main features and corresponding flows. The two main feature are (1) seamless automatic checkout and (2) interest detection.

The architecture 200 includes and/or otherwise involves a customer 210, a shopping cart 220, tag feature extraction 231 and cart mobility detection 232, advertisement and/or loyalty point dissemination 240, inside-cart item detection 250, automatic checkout 260, interest detection 270, a customer database 280, a retailer 290, and retail analytics 291. For the sake of clarity with respect to FIG. 2, elements of the shopping cart 220 have been omitted, but can be seen in at least FIG. 1.

The architecture 200 can be used as follows, according to an embodiment of the present invention. The customer 210 arrives at a store and grabs a shopping cart to use for a shopping session in the store. At that time, the customer can use their smart phone or a tablet that is attached to the shopping cart to receive (targeted) advertisements and/or loyalty points. The customer 210 starts shopping by picking up the items they want while navigating through different isles of the store.

Tag feature extraction 231 and cart mobility detection 232 are performed. In an embodiment, the tag feature extraction 231 and cart mobility detection 232 are performed concurrently (or with at least some overlap). These two operations are described in further detail below relative to method 300 of FIG. 3, and method 400 of FIG. 4, respectively.

Based on the tag feature extraction 231 and cart mobility detection 232, inside-cart item detection 250 is performed. The inside-cart item detection 250 can involve purchase tracking 251 in order to facilitate the automatic checkout 260.

The extracted features (e.g., RSSI, phase, etc.) from RFID tags from both inside-cart and outside-cart items are used then to detect exact inside-cart items at any instant for the inside-cart item detection 250.

The extracted features are combined with the inferred mobility state of the shopping cart to also help detect the interest of users in particular items through interest detection 270. This real-time user behavior combined with the (previous customer) database 280 helps retailers to generate personalized advertisements which can then be sent to the customer 210. Furthermore, (real-time) inside-cart item detection 250 also helps customers 210 to track their purchase.

Figure 3:
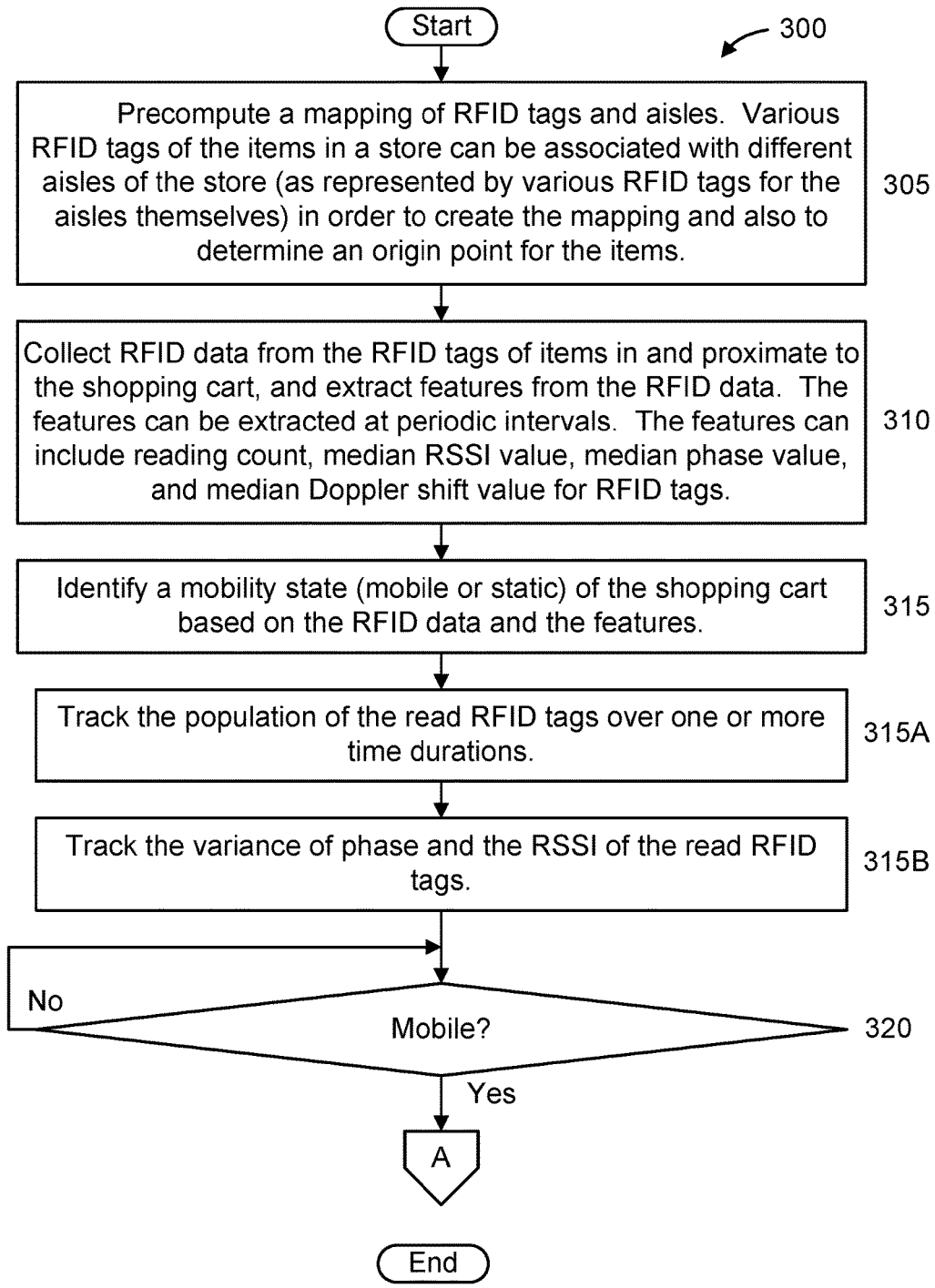
FIGS. 3-4 are flow diagrams showing an exemplary method for seamless automatic checkout, in accordance with an embodiment of the present invention.
Figure 4:
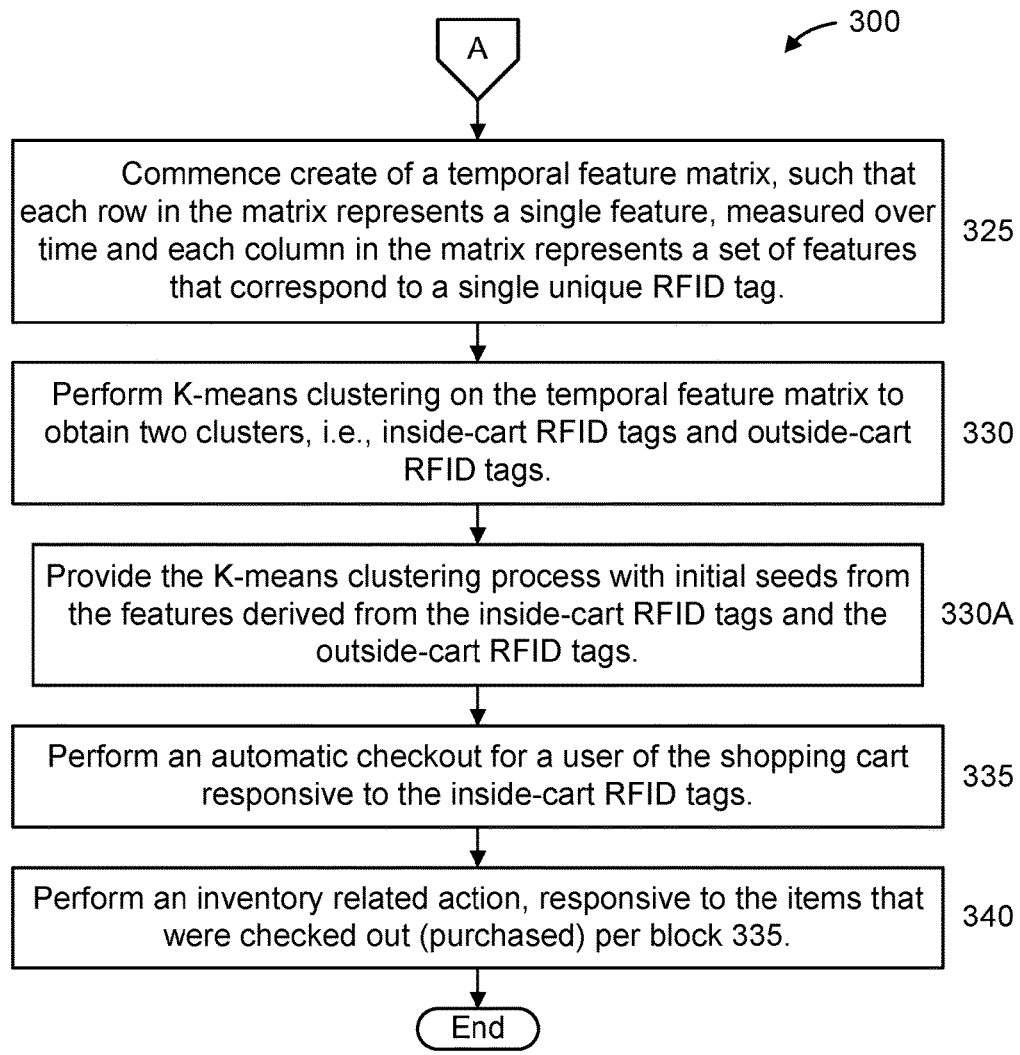

FIGS. 3-4 are flow diagrams showing an exemplary method 300 for seamless automatic checkout, in accordance with an embodiment of the present invention. It is to be appreciated that, in an embodiment, RFID tag feature extraction occurs (e.g., block 310) concurrently with cart mobility detection (e.g., block 315).

At block 305, precompute a mapping of RFID tags and aisles. In an embodiment, various RFID tags of the items in a store can be associated with different aisles of the store (as represented by various RFID tags for the aisles themselves) in order to create the mapping and also to determine an origin point (initial stocking point) for the items.

At block 310, collect RFID data from the RFID tags of items in and proximate to the shopping cart, and extract features from the RFID data. The features can be extracted at periodic intervals (e.g., every 30 seconds or some other duration). The features can include reading count, median RSSI value, median phase value, and median Doppler shift value for RFID tags.

At block 315, identify a mobility state of the shopping cart based on the RFID data and the features. The two possible options for mobility state are mobile and static.

In an embodiment, block 315 can include one or more of blocks 315A and 315B.

At block 315A, track the population of the read RFID tags over one or more time durations. By tracking the change and determining that the change is over a certain threshold amount, it can be determined that the shopping cart is mobile, otherwise the shopping cart is considered to be static.

At block 315B, track the variance of phase and the RSSI of the read RFID tags. The variance of phase and the RSSI of the read RFID tags will be more in a mobile setting compared to a static situation. This tracking also increases the confidence of cart mobility state detection.

At block 320, determine whether the mobility state is identified as mobile. If so, then proceed to block 325. Otherwise, return to block 320.

At block 325, commence create of a temporal feature matrix, such that each row in the matrix represents a single feature, measured over time (e.g., 1 second or other duration) and each column in the matrix represents a set of features that correspond to a single unique RFID tag.

At block 330, perform K-means clustering on the temporal feature matrix to obtain two clusters, i.e., inside-cart RFID tags and outside-cart RFID tags.

In an embodiment, block 330 includes block 330A.

At block 330A, provide the K-means clustering process with initial seeds from the features derived from the inside-cart RFID tags and the outside-cart RFID tags.

At block 335, perform an automatic checkout for a user of the shopping cart responsive to the inside-cart RFID tags. In this way, only inside-cart items will be checked out.

Figure 5:
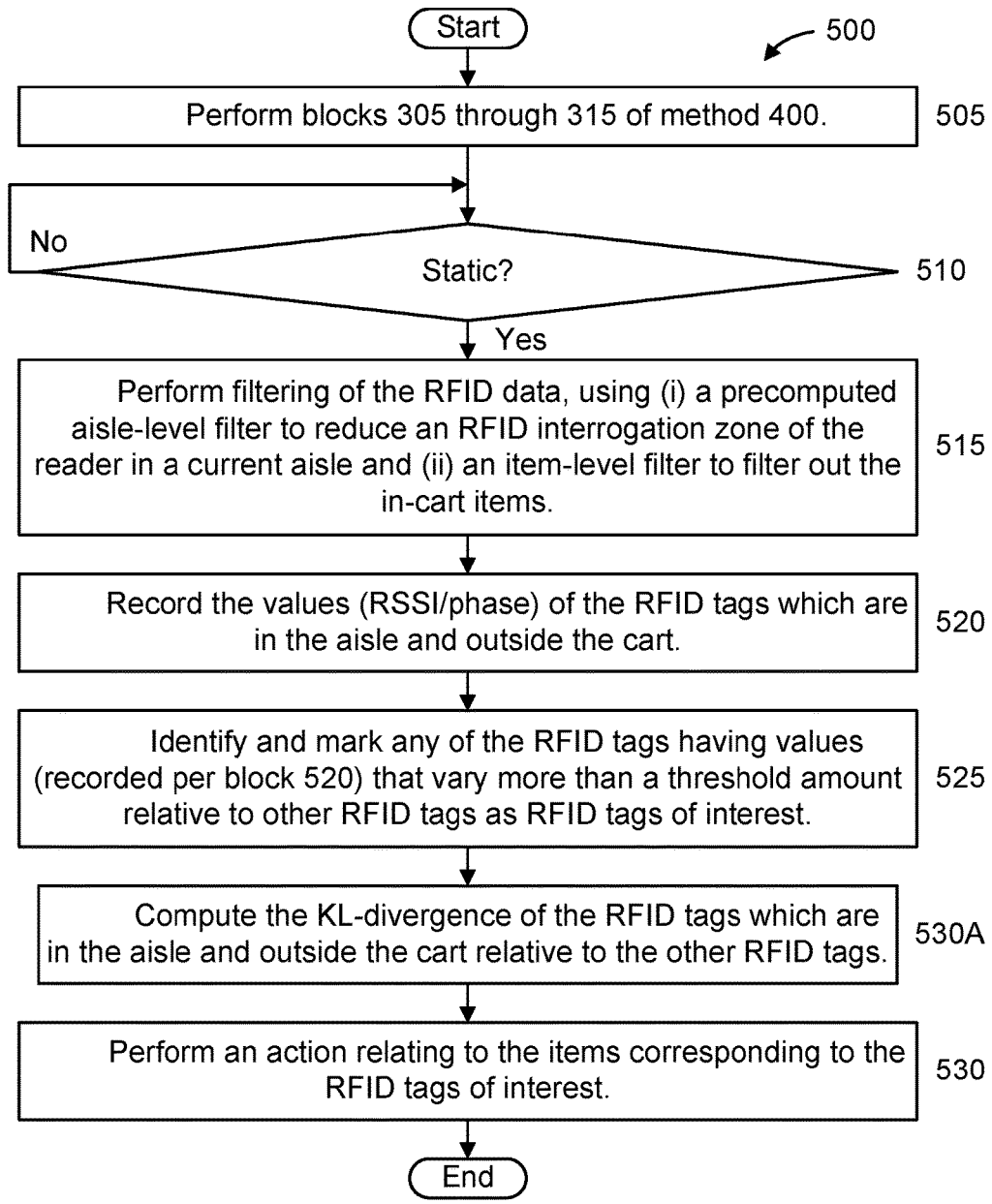
FIG. 5 is a flow diagram showing an exemplary method for interest detection, in accordance with an embodiment of the present invention.

FIG. 5 is a flow diagram showing an exemplary method 500 for interest detection, in accordance with an embodiment of the present invention.

As noted above, while method 300 is optimally performed when the shopping cart is mobile, method 500 is optimally performed when the shopping cart is static. As such, and given that both methods can be implemented for the same shopping session by a user, method 500 can involve the same initial blocks as method 300, taking different blocks upon the detection of the shopping cart being static. Accordingly, the following description of method 500

At block 505, perform blocks 305 through 315 of method 300.

At block 510, determine whether the mobility state is identified as static. If so, then proceed to block 515. Otherwise, return to block 520.

At block 515, perform filtering of the RFID data, using (i) a precomputed aisle-level filter to reduce an RFID interrogation zone of the reader in a current aisle and (ii) an item-level filter to filter out the inside-cart items. The filtering has the effect of concentrating the interrogation zone to an aisle of interest without the inside-cart items.

At block 520, record the values (RSSI/phase) of the RFID tags which are in the aisle and outside the cart.

At block 525, identify and mark any of the RFID tags having values (recorded per block 520) that vary more than a threshold amount relative to other RFID tags as RFID tags of interest.

In an embodiment, block 525 can include block 525A.

At block 525A, compute the KL-divergence of the RFID tags which are in the aisle and outside the cart relative to the other RFID tags.

At block 530, perform an action relating to the items corresponding to the RFID tags of interest. The action can be performed to enhance the interest of the user in any items of interest. For example, in an embodiment, advertisements directed to the items can be provided to the user. In an embodiment, the advertisements can be provided to the user via the user's smartphone and/or a tablet attached to the shopping cart and/or through some other device/method. In an embodiment, an expected amount of the items to be ordered can be adjusted in anticipation of a future possible purchase of the items. Of course, the present invention is not limited to solely the preceding actions and, thus, other actions can also be performed, while maintaining the spirit of the present invention.

Figure 6:
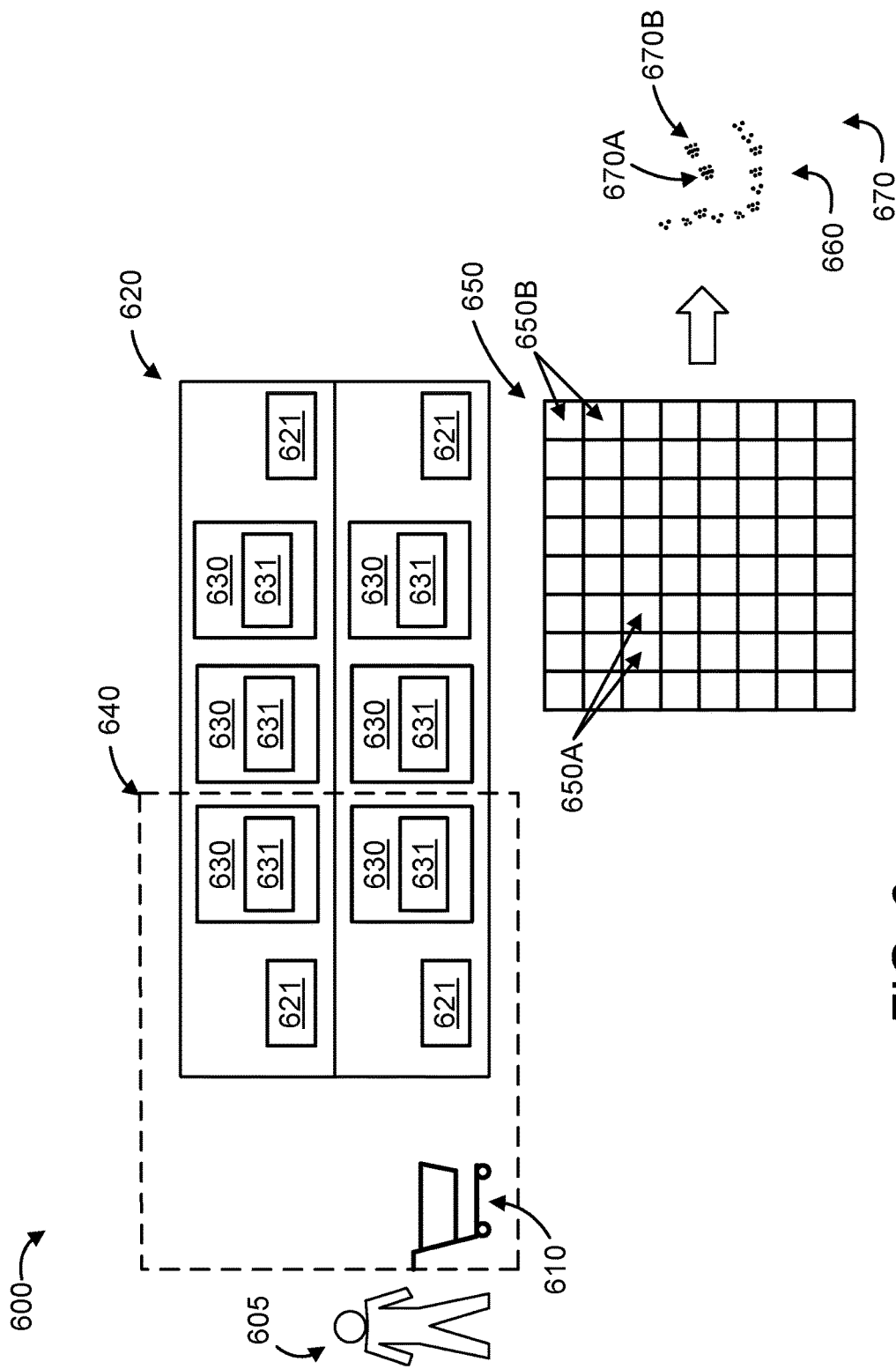
FIG. 6 is a block diagram showing an exemplary environment for inside-cart item detection and interest detection, in accordance with an embodiment of the present invention.

FIG. 6 is a block diagram showing an exemplary environment 600 for inside-cart item detection and interest detection, in accordance with an embodiment of the present invention.

The environment 600 includes a customer 605, shopping cart 610, an aisle 620, reference (i.e., aisle) RFID tags 621, aisle items 630, aisle item RFID tags 631, an interrogation zone 640, a temporal feature matrix 650, a high-dimensional feature space 660, and a clustering process 670.

The environment 600 shows an exemplary spatial arrangement of some of the elements of the present invention for the sake of illustration. Hence, it is to be appreciated that other configurations can also be used in accordance with the teachings of the present invention, while maintaining the spirit of the present invention.

In environment 600, the interrogation zone 640 is formed proximate to the customer 605. The interrogation zone 640 can be used for inside-cart item detection as well as interest detection. It is to be appreciated that the interrogation zone is not drawn to scale as the same is shown for the sake of illustration and can vary depending upon various factors as readily appreciated by one of ordinary skill in the art.

The temporal feature matrix 650, whose computation is commenced when a mobility status of the shopping cart 610 is determined to be mobile, includes each row in the matrix represents a single feature 650A, measured over time (e.g., 1 second or other duration) and each column in the matrix represents a set of features 650B that correspond to a single unique RFID tag.

The clustering process 670 is applied to the high-dimensional feature space 660 to obtain two clusters 670A and 670B, as described above.

Figure 7:
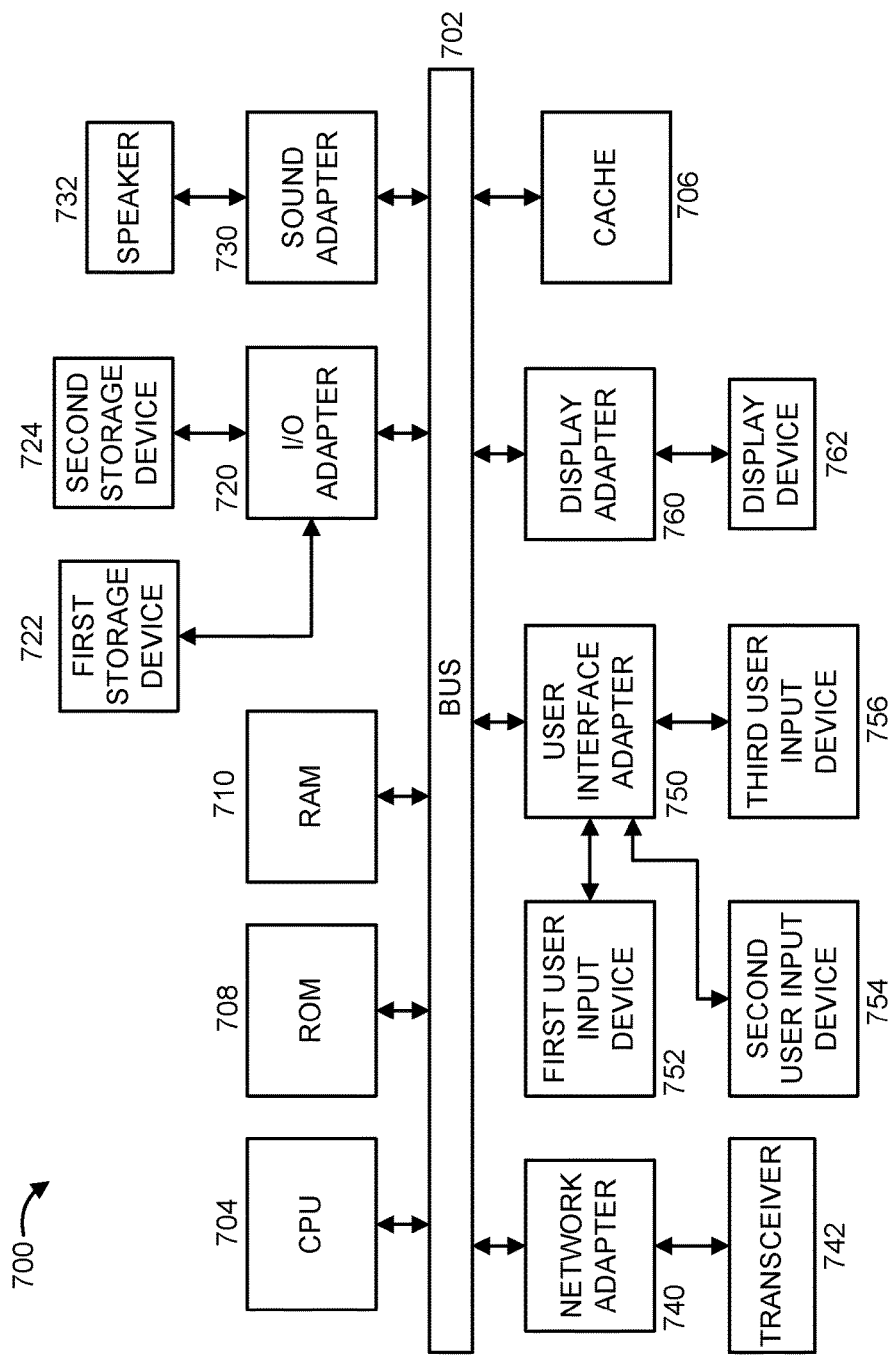
FIG. 7 is a block diagram showing an exemplary processing system to which the present principles may be applied, according to an embodiment of the present principles.

FIG. 7 is a block diagram showing an exemplary processing system 700 to which the present principles may be applied, according to an embodiment of the present principles.

The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 730. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

Moreover, it is to be appreciated that system 200 described above with respect to FIG. 2 is a system for implementing respective embodiments of the present principles. Part or all of processing system 700 may be implemented in one or more of the elements of system 200.

Further, it is to be appreciated that processing system 700 may perform at least part of the methods described herein including, for example, at least part of method 300 of FIGS. 3-4 and/or at least part of method 500 of FIG. 5. Similarly, it is to be appreciated that system 200 may perform at least part of the methods described herein including, for example, at least part of method 300 of FIGS. 3-4 and/or at least part of method 500 of FIG. 5.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

The invention claimed is:

1. A system for use with a shopping cart in a store, the system comprising:
   Radio-Frequency Identification (RFID) tags, including item RFID tags associated with items for sale and reference RFID tags associated with various aisles in the store, for providing RFID data; and
   a RFID reader, operatively coupled to the shopping cart, and configured to read RFID data from the item RFID tags and the reference RFID tags, extract features from the RFID data, identify any of the items having feature values associated therewith greater than a threshold amount as inside-cart items to be processed during an automatic checkout, and perform the automatic checkout on only the inside-cart items;
   wherein the features comprise a reading count, a median phase value, and a median Doppler shift; and
   wherein the RFID reader identifies the inside-cart items using a temporal feature matrix such that each row in the matrix represents a single one of the features measured over time and each column in the matrix represents a set of the features that correspond to a single one of the item RFID tags.

2. The system of claim 1, wherein the RFID reader identifies the actual inside-cart items by applying a clustering process to the temporal feature matrix to obtain a first cluster of the inside-cart RFID tags and a second cluster of outside-cart RFID tags, wherein the automatic checkout is performed for only the items corresponding to the inside-cart RFID tags.

3. The system of claim 2, wherein the clustering process is commenced using initial seeds derived from the features.

4. The system of claim 1, wherein the features further comprise a median Received Signal Strength Indication.

5. The system of claim 1, wherein the RFID reader is further configured to determine a mobility state of the shopping cart by tracking a variance of a phase and a Received Signal Strength Indication of the RFID tags.

6. The system of claim 1, wherein the RFID reader is further configured to determine a mobility state of the shopping cart by tracking a population of the RFID tags in an interrogation zone.

7. A method for use with a shopping cart in a store, the method comprising:
   reading, by a Radio-Frequency Identification (RFID) reader operatively coupled to the shopping cart, RFID data from Radio-Frequency Identification (RFID) tags including item RFID tags associated with items for sale and reference RFID tags associated with various aisles in the store;
   extracting, by the RFID reader, features from the RFID data;
   identifying, by the RFID reader, any of the items having feature values associated therewith greater than a threshold amount as inside-cart items to be processed during an automatic checkout; and
   performing, by the RFID reader, the automatic checkout on only the inside-cart items;
   wherein the features comprise a reading count, a median phase value, and a median Doppler shift; and
   wherein the RFID reader identifies the inside-cart items using a temporal feature matrix such that each row in the matrix represents a single one of the features measured over time and each column in the matrix represents a set of the features that correspond to a single one of the item RFID tags.

8. The method of claim 7, wherein the RFID reader identifies the actual inside-cart items by applying a clustering process to temporal feature matrix to obtain a first cluster of the inside-cart RFID tags and second cluster of outside-cart RFID tags, wherein the automatic checkout is performed for only the items corresponding to the inside-cart RFID tags.

9. The method of claim 8, wherein the clustering process is commenced using initial seeds derived from the features.

10. The method of claim 7, wherein the features further comprise a median Received Signal Strength Indication.

11. The method of claim 7, further comprising determining a mobility state of the shopping cart by tracking a variance of a phase and a Received Signal Strength Indication of the RFID tags.

12. The method of claim 7, further comprising determining a mobility state of the shopping cart by tracking a population of the RFID tags in an interrogation zone.

13. A non-transitory article of manufacture tangibly embodying a computer readable program which when executed causes a computer to perform the steps of claim 7.

14. A system for use with a shopping cart in a store, the system comprising:
    Radio-Frequency Identification (RFID) tags, including item RFID tags associated with items for sale and reference RFID tags associated with various aisles in the store, for providing RFID data; and
    a RFID reader, operatively coupled to the shopping cart, and configured to read RFID data from the item RFID tags and the reference RFID tags, extract features from the RFID data, and identify any of the items having feature values associated therewith that vary greater than a threshold amount over a threshold time duration as items of interest;
    wherein the features comprise a reading count, a median phase value, and a median Doppler shift; and
    wherein the RFID reader identifies the inside-cart items using a temporal feature matrix such that each row in the matrix represents a single one of the features measured over time and each column in the matrix represents a set of the features that correspond to a single one of the item RFID tags.

15. The system of claim 14, wherein the RFID reader is further configured to record the feature values of the RFID tags of the items which are in a current one of the various aisles and outside of the shopping cart to identify the items of interest.

16. The system of claim 14, wherein the RFID reader is further configured to perform filtering of the RFID data, using (i) a precomputed aisle-level filter to reduce an RFID interrogation zone of the reader in a current one of the various aisles and (ii) an item-level filter to filter out the inside-cart items from the outside-cart items to identify the actual inside-cart items.

17. The system of claim 14, further comprising a display device operatively coupled to the shopping cart, wherein the RFID reader causes an action to be performed on the display device relative to at least one of the items of interest to enhance an interest of the user in the at least one of the items of interest.

18. The system of claim 14, wherein the feature values that vary greater than the threshold amount over the threshold time duration are determined using Kullback-Leibler divergence.

* * * * *